(12) United States Patent
Kolodziej et al.

(10) Patent No.: US 11,757,859 B2
(45) Date of Patent: Sep. 12, 2023

(54) RUN-TIME ATTESTATION OF A USER WORKSPACE

(71) Applicant: Dell Products L.P., Round Rock, TX (US)

(72) Inventors: Jason A. Kolodziej, Falls City, TX (US); Anantha K. Boyapalle, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 318 days.

(21) Appl. No.: 17/324,381

(22) Filed: May 19, 2021

(65) Prior Publication Data
US 2022/0377062 A1    Nov. 24, 2022

(51) Int. Cl.
*H04L 9/40* (2022.01)
*G06F 8/60* (2018.01)

(52) U.S. Cl.
CPC ............ *H04L 63/08* (2013.01); *G06F 8/60* (2013.01); *H04L 63/126* (2013.01)

(58) Field of Classification Search
CPC ....... H04L 63/20; H04L 63/08; H04L 63/126; G06F 21/575; G06F 8/60; G06F 21/64; G06F 21/44
USPC .......................................................... 726/7
See application file for complete search history.

(56) References Cited

U.S. PATENT DOCUMENTS

| | | | |
|---|---|---|---|
| 8,601,550 B2* | 12/2013 | Hopen ............... | H04L 63/10 709/224 |
| 2009/0204964 A1* | 8/2009 | Foley ................ | G06F 21/53 718/1 |

* cited by examiner

*Primary Examiner* — Benjamin A Kaplan
(74) *Attorney, Agent, or Firm* — McDermott Will & Emery LLP (57) ABSTRACT

Run-time attestation of a workspace including deploying, at a client information handling system, an application broker, the application broker including a model that defines characteristics of a computer-implemented application accessible through a server information handling system; establishing a trust relationship between a control vault system of the client information handling system and the server information handling system; provisioning entitlements, by the application broker, that are associated with the computer-implemented application at the client information handling system; identifying an execution of the entitlements at the client computing device, and comparing the execution of the entitlements with the model; determining, based on the comparing, a violation of the model, and in response, procuring a trust challenge from the server information handling system; generating, by the application broker and in response to the trust challenge, an attestation of the trust relationship between the control vault system and the server information handling system.

20 Claims, 4 Drawing Sheets

RUN-TIME ATTESTATION OF A USER WORKSPACE

BACKGROUND

Field of the Disclosure

The disclosure relates generally to an information handling system, and in particular, run-time attestation of a user workspace at the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, when an enterprise employs contractors for brief periods of time (for specific jobs), the contractor can be provided an information handling system with an enterprise image, security, and appropriate software. This can cause delays as it is time cumbersome to set up the contractor with such information handling system.

SUMMARY

Innovative aspects of the subject matter described in this specification may be embodied in a method of run-time attestation of a workspace, the method including: deploying, at a client information handling system, an application broker, the application broker including a dynamically attestable runtime properties model that defines characteristics of a computer-implemented application, the computer-implemented application accessible through a server information handling system; establishing a trust relationship between a control vault system of the client information handling system and the server information handling system; provisioning entitlements, by the application broker, that are associated with the computer-implemented application at the client information handling system; identifying an execution of the entitlements at the client computing device, and comparing the execution of the entitlements with the dynamically attestable runtime properties model; determining, based on the comparing, a violation of the dynamically attestable runtime properties model, and in response, procuring a trust challenge from the server information handling system; and generating, by the application broker and in response to the trust challenge, an attestation of the trust relationship between the control vault system and the server information handling system.

Other embodiments of these aspects include corresponding systems, apparatus, and computer programs, configured to perform the actions of the methods, encoded on computer storage devices.

These and other embodiments may each optionally include one or more of the following features. For instance, receiving, from the server information handling system and at the application broker, an action response to the attestation. Invoking, by the application broker, the action response at the client information handling system. The action response includes denying execution of the entitlements at the client computing device. The action response includes allowing execution of the entitlements at the client computing device. Authenticating the client information handling system at the server information handling system. Deploying the application broker at the client information handling system is in response to authenticating the client information handling system at the server information handling system. The characteristics of the computer-implemented application include file management kernel-service characteristics, structural-constraint characteristics, and equality-based data invariant characteristics. Verifying a signature and nonce of the control vault system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for run-time attestation of a user workspace at the information handling system. In short, an application broker can facilitate performing a runtime attestation of a client information handling system and/or a user space environment of a client information handling system (for example, including an unmanaged operating system). The application broker can utilize a model that models the characteristics of a computer-implemented application located in a trusted environment, and create a trust boundary to perform tasks utilizing such application. Moreover, the application broker can facilitate clean up and restore of the client information handling system to an original state.

Specifically, this disclosure discusses a system and a method for run-time attestation of a workspace, including deploying, at a client information handling system, an application broker, the application broker including a dynamically attestable runtime properties model that defines characteristics of a computer-implemented application, the computer-implemented application accessible through a server information handling system; establishing a trust relationship between a control vault system of the client information handling system and the server information handling system; provisioning entitlements, by the application broker, that are associated with the computer-implemented application at the client information handling system; identifying an execution of the entitlements at the client computing device, and comparing the execution of the entitlements with the dynamically attestable runtime properties model; determining, based on the comparing, a violation of the dynamically attestable runtime properties model, and in response, procuring a trust challenge from the server information handling system; and generating, by the application broker and in response to the trust challenge, an attestation of the trust relationship between the control vault system and the server information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
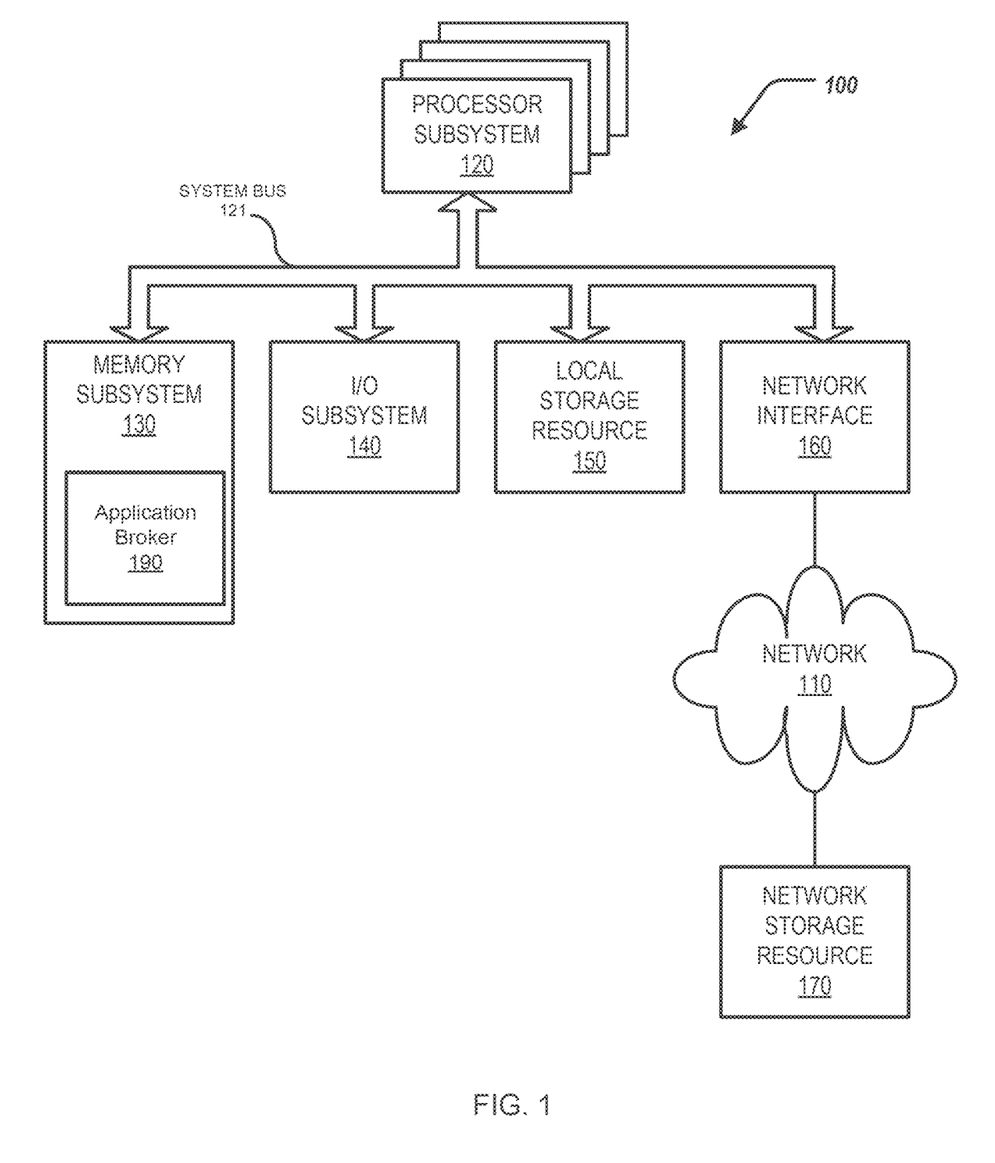
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an application broker (computing module) 190. The application broker 190 can be included by the memory subsystem 130. The application broker 190 can include a computer-executable program (software). The application broker 190 can be executed by the processor subsystem 120.

In short, the application broker 190 can facilitate performing a runtime attestation of a client information handling system and/or a user space environment of the client information handling system (for example, including an unmanaged operating system). The application broker 190 can utilize a model that models the characteristics of a computer-implemented application located in a trusted environment, and create a trust boundary to perform tasks utilizing such application. Moreover, the application broker 190 can facilitate clean up and restore of the client information handling system to an original state.

Figure 2:
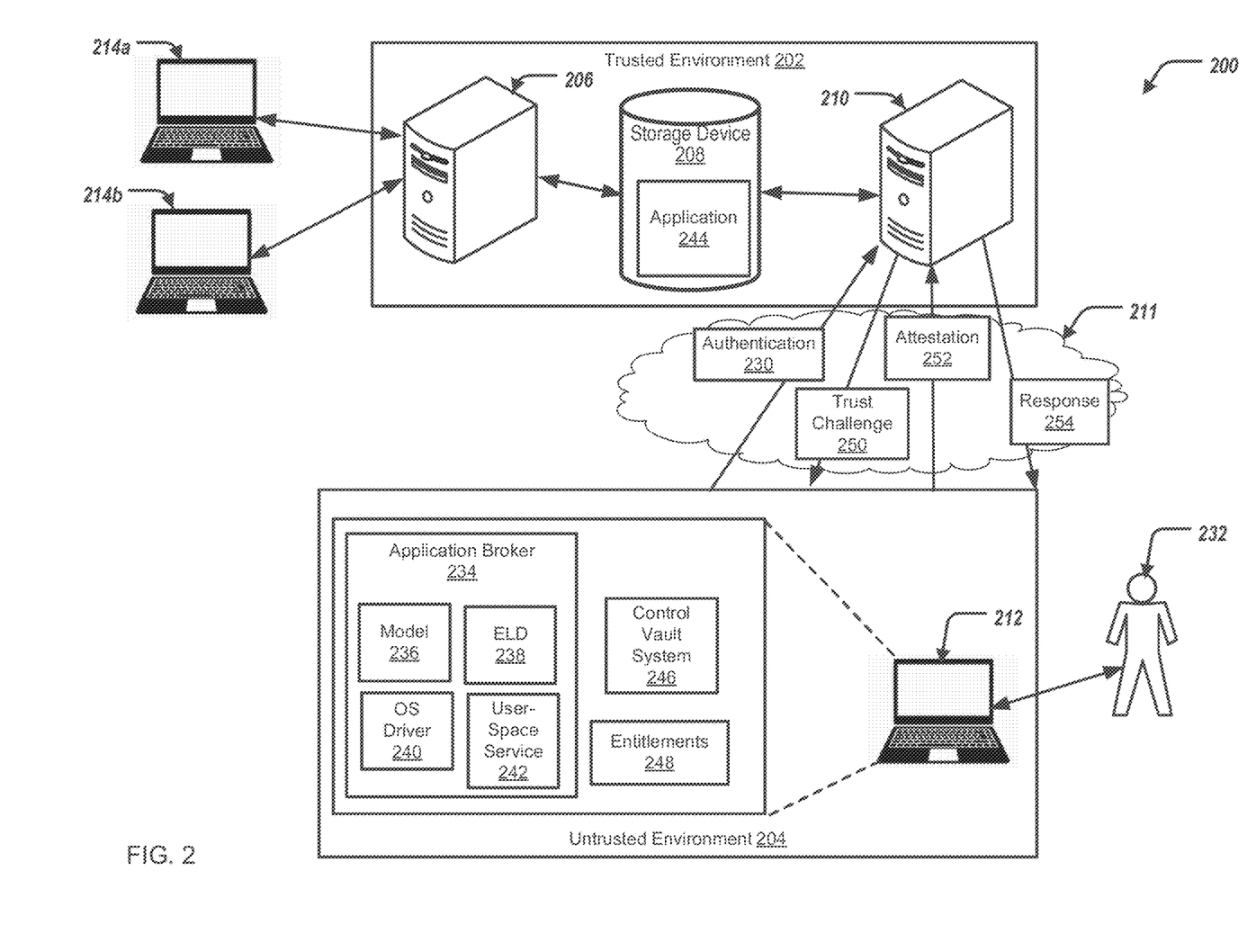
FIG. 2 illustrates a block diagram of an information handling system for run-time attestation of a user workspace at the information handling system.

Turning to FIG. 2, FIG. 2 illustrates an environment 200 including a trusted environment 202 and an untrusted environment 204. The trusted environment 202 can include an on-premise information handling system 206, a storage device 208, and a server (or quarantine) information handling system 210. The untrusted environment 204 can include a client information handling system 212. The environment 200 can further include enterprise information handling systems 214a, 214b (collectively referred to as enterprise information handling systems 214). The server information handling system 210 can be in communication with the client computing device 212 and the storage device 208. The on-premise information handling system 206 can be in communication with the storage device 208 and the enterprise information handling systems 214. In some examples, any of the information handling systems 206, 210, 212, 214 are similar to, or includes, the information handling system 100 of FIG. 1.

The client information handling system 212 can be in communication with the trusted environment 202, and in particular, the server information handling system 210, over one or more networks. For example, the client information handling system 212 can be in communication with the server information handling system 210 over an untrusted/unsafe network 211.

To that end, the environment 200 can facilitate a run-time attestation of a workspace of the client information handling system 212, described further herein Initially, the client information handling system 212 can request authentication 230 from the server information handling system 210. For example, a user 232 that is associated with (using) the client information handling system 212 can provide login credentials (e.g., username and password) to the server information handling system 210 (authentication 230). The server information handling system 210 can authenticate the client information handling system 212 for possible access to the trusted environment 202.

In some examples, it is undesirable for the client information handling system 212 to communicate directly with the on-premise information handling system 206 and/or the storage device 208. For example, the client information handling system 212 may be compromised, and have undesirable/detrimental effects on the trusted environment 202 if the client information handling system 202 communicated directly with the on-premise information handling system 206 and/or the storage device 208. Thus, the client information handling system 212 only communicates with the server information handling system 210 that is separated/quarantined from the remaining portions of the trusted environment 202.

The server information handling system 210 can deploy, at the client information handling system 212, an application broker 234. In some examples, the application broker 234 is deployed at the client information handling system 212 in response to the authentication of the client information handling system 212 at the server information handling system 210. In some examples, the application broker 234 is the same, or substantially the same, as the application broker 190 of FIG. 1.

The application broker 234 can include a dynamically attestable runtime properties (DARt-P) model 236, an early loaded driver (ELD) 238, an operating system (OS) driver 240, and a user-space service module 242. The model 236 can define characteristics of a computer-executable application 244 of the trusted environment 202. Specifically, the server information handling system 210 can provide access to the application 244 that is stored by the storage device 208. That is, the application 244 is accessible by the client information handling system 212 through the server information handling system 210. The model 236 can define (include) characteristics of the application 244 (e.g., through the lifetime of the application 244)

The ELD 238 can provide integrity checking of the OS driver 240, the user-space service module 242, and provide a store of the model 236 of the application 244. Specifically, the ELD 238 can ensure that the application broker 234 (as a whole) has not been compromised/tampered with (e.g., the ELD 238 can invalidate a static platform configuration register (PCR)). The ELD 238 can get measured at early OS Kernel initiation of the client information handling system 212 into a static PCR. In some examples, the ELD 238 can be placed/stored at a static PCR of the client information handling system 212, and verify integrity of the model 236, the OS driver 240, and the user-space service 242.

The OS driver 240 can monitor execution (launch) of the application 244 by the client information handling system 212 and compare such with the model 236, described further herein. The OS driver 240 can extend violations of the model 236 into a static PCR, and deny or allow execution of the application 244, described further herein. The user-space service module 242 can handle trustful interactions between the client information handling system 212 and assets at the trusted environment 202, such as the application 244. In short, the user-space service module 242 can communicate with the server information handling system 210.

To that end, during runtime (RT), both the OS and the kernel of the client information handling system 212 can be compromised (vulnerable to attacks). The OS of the client information handling system 212 can be unmanaged by any of the components of the trusted environment 202, and is unable to be trusted due to possibility of remote attacks. The ELD 238 can be implemented in such situations, as described prior.

In some examples, the model 236 can define characteristics of the application 244 such as file-management kernel-server characteristics. For example, characteristics such as obtaining and/or setting file permissions and creating, deleting, reading, writing, repositioning, or closing of a file associated with the application 244. In some examples, the model 236 can define characteristics of the application 244 such as structural-constraint characteristics. For example, characteristics such as a function that is returning to its calling function, properly knowing of a stored location of the calling function associated with the application 244. In some examples, the model 236 can define characteristics of the application 244 such as equality-based data invariant characteristics. For example, characteristics such as two data variables having the same value at a point in the application 244 (unchanged equality properties).

The application broker 234 can facilitate establishing a trust relationship between a control vault system 246 of the client information handling system 212 and the server information handling system 210. In some examples, the control vault system 246 is a trusted platform module (TPM). In some examples, the trust relationship is further defined between a workspace at the client information handling system and the server information handling system 210 (e.g., the workspace including a combination of applications, policies, storage, temporary files and the control vault system 246).

The server information handling system 210 and/or the application broker 234 can provision entitlements 248 at the client information handling system 212. The entitlements 248 are associated with the application 244. For example, the entitlements 248 allow/facilitate access/execution of the application 244 by the client computing device 212.

The application broker 234 can identify execution (or enablement) of the entitlements 248 at the client computing device 212, and in response, compare the entitlements 248 with the model 236. For example, the comparison can determine if the workspace at the client information handling system 212 and/or the client information handling system 212 has been modified and/or compromised. The comparison can identify differences between execution of the application 244 and the model 236 that defines characteristics of the application 244.

The application broker 234 can determine, based on the comparing, a violation of the model 236, and in response, procure a trust challenge 250 from the server information handling system 210. The trust challenge 250 can be a credential trust challenge.

The application broker 234 can generate, in response to the trust challenge 250, an attestation 252 of the trust relationship between the control vault system 246 and the server information handling system 210. That is, the attestation 252 can be a signed response to the trust challenge 250 by the control vault system 246. The server information handling system 210 can attest to the trust relationship between a workspace of the client information handling system 212 (and/or the client information handling system 212) by verifying the signature and the nonce of the attestation 252, and in some examples, verifying/checking an accuracy of logs of the applications broker 234 written to a static PCR.

The application broker 234 can receive, from the server information handling system 210, an action response 254 to the attestation 252. That is, when the server information handling system 210 verifies the attestation 252, the server information handling system 210 can provide the response 254 to the application broker 234. For example, the action response 254 can include allowing execution of the entitlements 248 by the client information handling system 212 for execution of the application 244. The application broker 234 can invoke the response 254 at the client information handling system 212, including allowing execution of the entitlements 248 by the client information handling system 212 for execution of the application 244.

In a further example, when the server information handling system 210 disapproves the attestation 252, the server information handling system 210 can provide the response 254 to the application broker 234. For example, the action response 254 can include denying execution of the entitlements 248 by the client information handling system 212 for execution of the application 244. The application broker 234 can invoke the response 254 at the client information handling system 212, including denying execution of the entitlements 248 by the client information handling system 212 for execution of the application 244.

In some examples, the application broker 234 can remove the entitlements 248, and any temporary files, provisioning, and/or policies that were created when accessing the application 244, from the client information handling system 212. For example, the application broker 234 can remove such after the user 232 has completed using the application 244.

Figure 3:
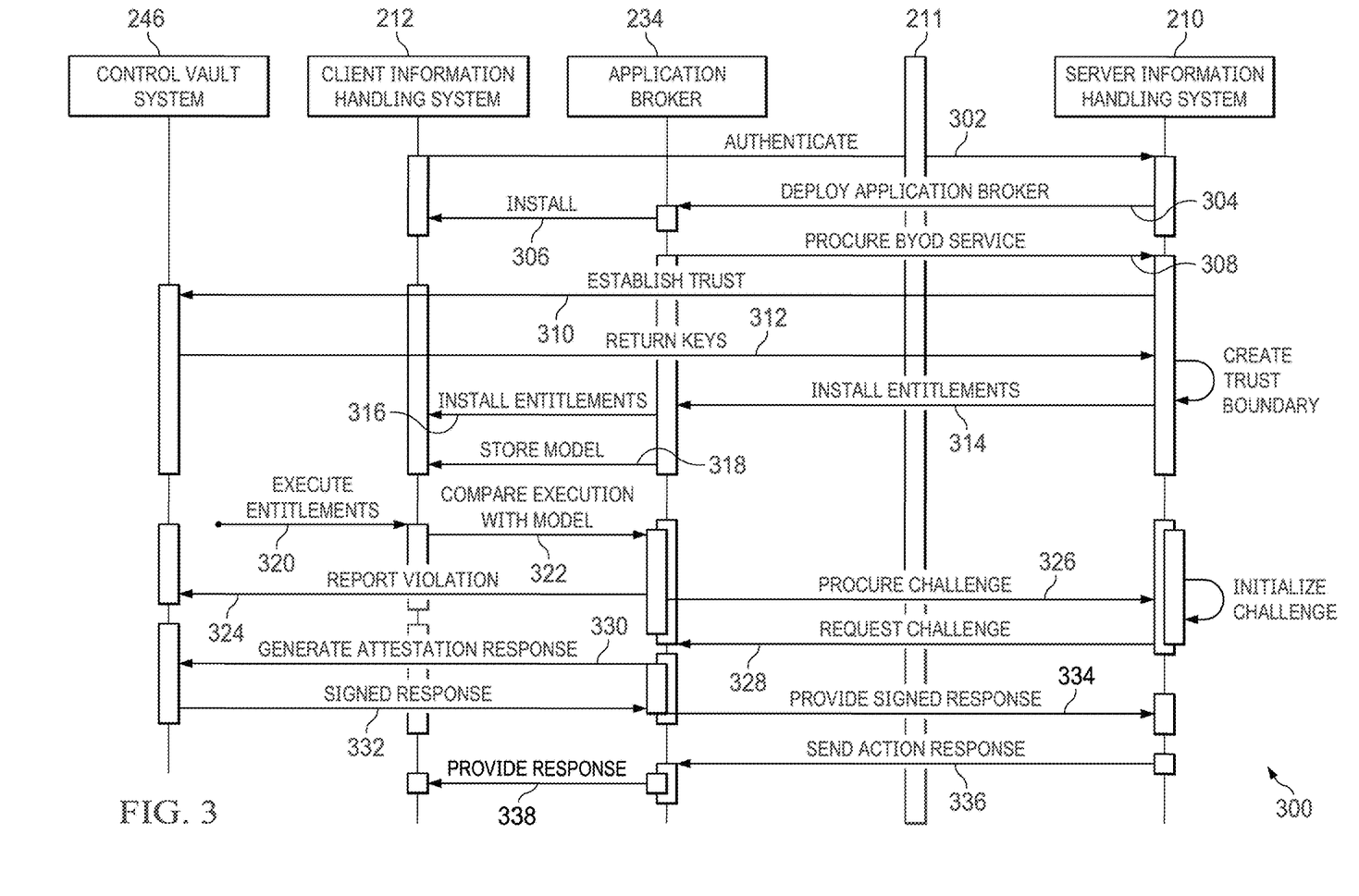
FIG. 3 is a swim-lane diagram of run-time attestation of a user workspace at the information handling system.

FIG. 3 illustrates a swim-lane diagram depicting selected elements of an embodiment of a method 300 for run-time attestation of a user workspace at the information handling system. The method 300 may be performed by the information handling system 100, the environment 200, the storage device 208, the server information handling system 210, the client information handling system 212, and/or the application broker 234, and with reference to FIGS. 1-2. It is noted that certain operations described in method 300 may be optional or may be rearranged in different embodiments.

The client information handling system 212 authenticates with the server information handing system 210, at 302. The server information handling system 210 deploys the application broker 234, at 304. The application broker 234 is installed at the client information handling system 212, at 306. The application broker 234 procures service from the server information handling system 210, at 308. The server information handling system 210 can establish a trust relationship (or trust boundary) with the control vault system 246, at 310. The control vault system 246 can return keys (or encryption keys) to the server information handling system 210, at 312. The server information handling system 210 can deploy the entitlements 248 to the application broker 234, at 314. The application broker 234 can install the entitlements 248 at the client information handling system 212, at 316. The application broker 234 can store the model 236 at the client information handling system 212, at 318. The user 232 can execute the entitlements 248 at the client information handling system 212, at 320. The client information handling system 212 can check (compare) the model 236 at the application broker 234, at 320. The application broker 234 can report a violation (in response to comparing with the model 236) to the control vault system 246, at 324. The application broker 234 can procure a trust challenge from the server information handling system 210, at 326. The server information handling system 210 can provide the trust challenge to the application broker 234, at 328. The application broker 234 can generate an attestation response to the control vault system 246, at 330. The control vault system 246 provide a signed response to the application broker 234, at 332. The application broker 234 provides the signed response to server information handling system 210, at 334. The server information handling system 210 can send an action response to the application broker 234, at 336. The application broker 236 provides the response to the client information handling system 212 for enabling the response, at 338.

Figure 4:
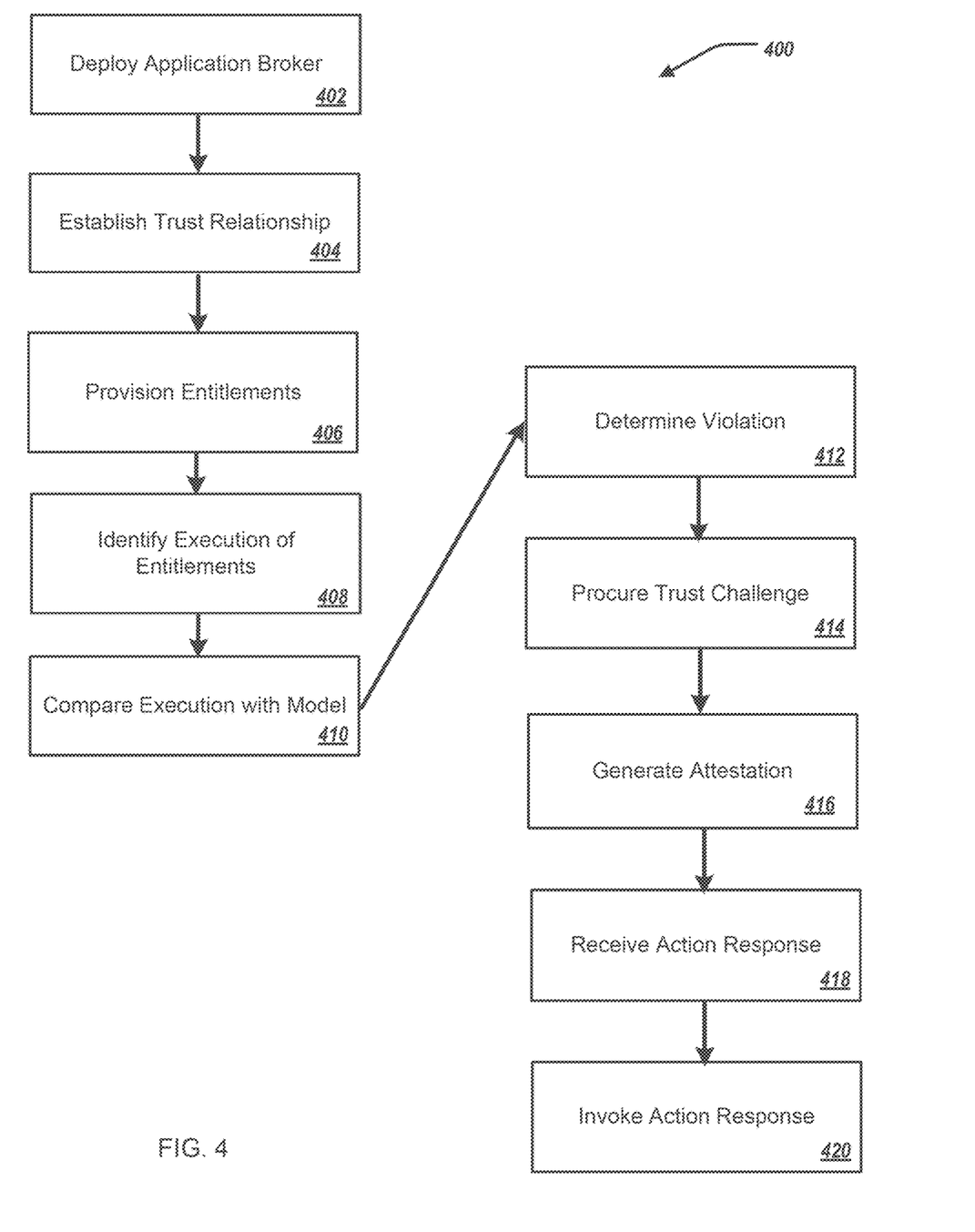
FIG. 4 illustrates a method for run-time attestation of a user workspace at the information handling system.

FIG. 4 illustrates a flowchart depicting selected elements of an embodiment of a method 400 for run-time attestation of a user workspace at the information handling system. The method 400 may be performed by the information handling system 100, the environment 200, the storage device 208, the server information handling system 210, the client information handling system 212, and/or the application broker 234, and with reference to FIGS. 1-2. It is noted that certain operations described in method 400 may be optional or may be rearranged in different embodiments.

The server information handling system 210 deploys, at the client information handling system 212, the application broker 234 (402). In some examples, the application broker 234 includes the dynamically attestable runtime properties model 236 that defines characteristics of the computer-implemented application 244. The computer-implemented application 244 is accessible through the server information handling system 210. A trust relationship is established between the control vault system 246 of the client information handling system 212 and the server information handling system 212 (404). The application broker 234 provisions the entitlements 248 that are associated with the computer-implemented application 244 at the client information handling system 212 (406). The application broker 234 identifies an execution of the entitlements 248 at the client computing device 212 (408). The application broker 234 compares the execution of the entitlements 248 with the dynamically attestable runtime properties model 236 (410). The application broker 234 determines, based on the comparing, a violation of the dynamically attestable runtime properties model 236 (412). The application broker 234, in response to determining the violation, procures the trust challenge 250 from the server information handling system 212 (414). The application broker 234 generates, in response to the trust challenge 250, the attestation 252 of the trust relationship between the control vault system 246 and the server information handling system 212 (416). The application broker 234 receives, from the server information handling system 212, the action response 254 to the attestation 252 (418). The application broker 234 invokes the action response 254 at the client information handling system 212 (420).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of run-time attestation of a workspace, the method including:
   deploying, at a client information handling system, an application broker, the application broker including a dynamically attestable runtime properties model that defines characteristics of a computer-implemented application, the computer-implemented application accessible through a server information handling system;
   establishing a trust relationship between a control vault system of the client information handling system and the server information handling system;
   provisioning entitlements, by the application broker, that are associated with the computer-implemented application at the client information handling system;
   identifying an execution of the entitlements at the client computing device, and comparing the execution of the entitlements with the dynamically attestable runtime properties model;
   determining, based on the comparing, a violation of the dynamically attestable runtime properties model, and in response, procuring a trust challenge from the server information handling system; and
   generating, by the application broker and in response to the trust challenge, an attestation of the trust relationship between the control vault system and the server information handling system.

2. The computer-implemented method of claim 1, further comprising:
   receiving, from the server information handling system and at the application broker, an action response to the attestation.

3. The computer-implemented method of claim 2, further comprising:
   invoking, by the application broker, the action response at the client information handling system.

4. The computer-implemented method of claim 3, wherein the action response includes denying execution of the entitlements at the client computing device.

5. The computer-implemented method of claim 3, wherein the action response includes allowing execution of the entitlements at the client computing device.

6. The computer-implemented method of claim 1, further comprising:
   authenticating the client information handling system at the server information handling system.

7. The computer-implemented method of claim 6, wherein deploying the application broker at the client information handling system is in response to authenticating the client information handling system at the server information handling system.

8. The computer-implemented method of claim 1, wherein the characteristics of the computer-implemented application include file management kernel-service characteristics, structural-constraint characteristics, and equality-based data invariant characteristics.

9. The computer-implemented method of claim 1, further comprising:
   verifying a signature and nonce of the control vault system.

10. An information handling system comprising a processor having access to memory media storing instructions executable by the processor to perform operations, comprising:
    deploying, at a client information handling system, an application broker, the application broker including a dynamically attestable runtime properties model that defines characteristics of a computer-implemented application, the computer-implemented application accessible through a server information handling system;
    establishing a trust relationship between a control vault system of the client information handling system and the server information handling system;
    provisioning entitlements, by the application broker, that are associated with a workspace at the client information handling system;
    identifying an execution of the entitlements at the client computing device, and comparing the execution of the entitlements with the dynamically attestable runtime properties model;
    determining, based on the comparing, a violation of the dynamically attestable runtime properties model, and in response, procuring a trust challenge from the server information handling system; and
    generating, by the application broker and in response to the trust challenge, an attestation of the trust relationship between the control vault system and the server information handling system.

11. The information handling system of claim 10, further comprising:
    receiving, from the server information handling system and at the application broker, an action response to the attestation.

12. The information handling system of claim 11, further comprising:
    invoking, by the application broker, the action response at the client information handling system.

13. The information handling system of claim 12, wherein the action response includes denying execution of the entitlements at the client computing device.

14. The information handling system of claim 12, wherein the action response includes allowing execution of the entitlements at the client computing device.

15. The information handling system of claim 10, further comprising:
    authenticating the client information handling system at the server information handling system.

16. The information handling system of claim 15, wherein deploying the application broker at the client information handling system is in response to authenticating the client information handling system at the server information handling system.

17. The information handling system of claim 10, wherein the characteristics of the computer-implemented application include file management kernel-service characteristics, structural-constraint characteristics, and equality-based data invariant characteristics.

18. The information handling system of claim 10, further comprising:
    verifying a signature and nonce of the control vault system.

19. A non-transitory computer-readable medium storing software comprising instructions executable by one or more computers which, upon such execution, cause the one or more computers to perform operations comprising:

deploying, at a client information handling system, an application broker, the application broker including a dynamically attestable runtime properties model that defines characteristics of a computer-implemented application, the computer-implemented application accessible through a server information handling system;

establishing a trust relationship between a control vault system of the client information handling system and the server information handling system;

provisioning entitlements, by the application broker, that are associated with the computer-implemented application at the client information handling system;

identifying an execution of the entitlements at the client computing device, and comparing the execution of the entitlements with the dynamically attestable runtime properties model;

determining, based on the comparing, a violation of the dynamically attestable runtime properties model, and in response, procuring a trust challenge from the server information handling system; and generating, by the application broker and in response to the trust challenge, an attestation of the trust relationship between the control vault system and the server information handling system.

20. The transitory computer-readable medium of claim 19, further comprising:

receiving, from the server information handling system and at the application broker, an action response to the attestation.

* * * * *